ic Office

2,810,700

THERMOSETTING AMINE-ALDEHYDE MOLDING COMPOSITIONS

Leopold F. Bornstein, Wilmington, Del.

No Drawing. Application February 2, 1953,
Serial No. 334,730

9 Claims. (Cl. 260—17.3)

This invention relates to thermosetting molding compositions containing a catalyst of the latent type and to a process of making the same.

Molding compositions formed with the use of urea-formaldehyde and other resins having thermosetting properties, such as are commonly used in compression or transfer molding, are capable of curing at molding temperatures to give a rigid permanent product. However, the curing speed of molding compositions based on urea-formaldehyde and similar resins is too low for present requirements and the articles obtained therefrom will lack strength and water resistance.

In order to improve these properties, various curing catalysts, or hardening agents as they are sometimes called, have been suggested or used. These catalysts are usually chemical substances which speed up the curing of the resin binder of the molding composition by lowering the pH. As a result, the curing time is not only reduced, but a more thorough cure is accomplished with a consequent improvement of all-around properties including the water resistance. The substances of this nature that have heretofore been used, such as benzoic acid, salicyclic acid, cinnamic acid and similar compounds, have as one serious disadvantage a tendency to cure the molding composition even at room temperatures, and therefore, very materially reduce the molding properties if the molding composition is held in storage for any length of time.

Furthermore, urea-formaldehyde molding compositions are water sensitive, and usually they not only contain a small amount of moisture, but also have a tendency to absorb moisture from the atmosphere. All of the curing catalysts heretofore used have a certain solubility in water and tend to react with the resin component of the molding composition in the presence of moisture, and, therefore, will act to change the properties of the molding composition or render it unusable after a short period of time depending on the storage temperature, type of the catalyst used and the amount of moisture present either initially in the molding composition or which has become absorbed from the ambient atmosphere.

In order to overcome the disadvantageous premature reaction between the catalyst and the resin of the molding composition, it has been proposed to use a compound which is either entirely insoluble in water or will not show any acidic reaction at room temperature but which will decompose at a molding temperature to form a compound having a catalytic action on the resin component. Such compounds are sometimes designated as "latent catalysts." Most of such latent catalysts or hardeners are not sufficiently stable even at room temperature and they tend to decompose slowly causing the difficulties mentioned above. A typical latent catalyst of this type is benzoyl peroxide which furnishes benzoic acid at curing temperatures but yet does not show a sufficient amount of stability at storage temperature. Most of the hardeners presently used commercially are still lacking complete insolubility in water and are thus susceptible of partial hydrolysis and tend to cause the pre-curing of the molding composition under storage conditions. Some catalysts that are superior in this respect do not have a sufficient catalytic action and give a somewhat slower curing product.

It is an object of this invention to provide a novel latent catalyst for thermosetting compositions and especially for urea-formaldehyde molding compositions.

It is a further object of this invention to provide a thermosetting molding composition containing a novel latent catalyst and having improved molding properties.

It is another object of this invention to provide an improved molded product.

It is still another object of this invention to provide an improved method for preparing thermosetting urea-formaldehyde compositions containing a latent catalyst.

More specific objects and advantages will become apparent from the accompanying description, which discloses and illustrates the invention but which is not intended to be limitive thereof.

The novel latent catalyst of this invention is epichlorohydrin. A urea-formaldehyde molding composition containing epichlorohydrin as a latent catalyst is stable under ordinary storage conditions and may be used to produce highly satisfactory molded articles. Epichlorohydrin gives excellent stability to the molding composition during storage conditions and yet under molding conditions of temperature it will catalyze the curing to such an extent that the molding composition meets the rapid cure requirements of the user. It has also been found that molded urea-formaldehyde articles wherein epichlorohydrin was employed as a latent catalyst possess improved properties, especially as regards water resistances, as well as increased structural strength and stability and improved electrical properties.

The mechanism of the catalytic action of epichlorohydrin in promoting the cure of the molding composition has not been very clearly determined, although the indications are that the epichlorohydrin cross links with the urea-formaldehyde resin, making it more reactive and giving a product with superior properties.

The usual method of preparing a thermosetting molding composition of the urea-formaldehyde type is to condense urea and formaldehyde in the ratio of about two mols of formaldehyde to one mol of urea in a suitable vessel, yielding a condensation product in the form of a syrup. A suitable filler, usually an alpha cellulose one, is impregnated with this urea-formaldehyde syrup, and the material dried under atmospheric or vacuum conditions in a shelf drier or continuous oven until the moisture content of the material has been reduced to a predetermined degree and the condensation of the resin has advanced to a predetermined stage. The impregnated and dried material is ground to a fine powder, mixed with additional ingredients, such as pigments, dyes and lubricants, and used as is. This material can also be further densified to reduce its bulkiness and regranulated which represents another form of commercial product. The ratio of formaldehyde to urea can be changed, depending on the required properties, and it can be reduced to even one mol. The filler used for impregnating can be of another nature than alpha cellulose, such as wood flour, walnut-shell flour or even of a mineral nature.

The proportion of filler may vary over a wide range, usually not exceeding 60% by weight of the total composition, and more generally falling in the range 25–50% by weight based on the weight of the dried material.

The epichlorohydrin may be added during the grinding operation, which usually takes place in a ball mill, together with the other ingredients described previously. Epichlorohydrin, however, because of its very unique way of accelerating the cure and its relatively good stability at processing temperatures, can be added to the resin syrup prior to the impregnation and drying. If the drying temperature and time of drying are carefully controlled, no excessive reaction or advancing of the molding powder will take place at this stage and, therefore, it is not necessary to add the epichlorohydrin during the grinding operation. The material obtained in this way has a higher density.

Another method of preparing urea-formaldehyde molding compositions containing my novel latent catalyst is described in my co-pending application, Serial No. 343,249 filed March 18, 1953.

A molding composition containing epichlorohydrin and made according to any known method has an excellent storage stability. I have found that molding compositions containing epichlorohydrin as a latent catalyst can be kept at a storage temperature at times exceeding 90° F. for a relatively long period of time, up to about a year, without any considerable change of its flow characteristics. This stability has also been confirmed by a laboratory method known as the Duration Test. This method involves a determination of the length of time the molding composition may be held at an elevated temperature without becoming infusible to such an extent that it is no longer acceptable. According to this method, the stability of molding compounds can be predicted. For further details as to this method reference is made to U. S. Patent No. 2,510,762.

Molding compositions prepared with epichlorohydrin as a catalyst can be cured very rapidly and pass all the tests and requirements for a fast curing molding composition. One of the standard methods of checking this rate of cure is the amount of water absorbed by the molded article. This method is also outlined in U. S. Patent No. 2,510,762. It was found that the water absorption, as tested according to this method, was about 50% lower than that of the best grade standard molding compositions presently on the market.

The following examples are illustrative of the practice of this invention:

*Example I*

One hundred parts by weight of alpha cellulose are impregnated with an aqueous urea-formaldehyde syrup containing 150 parts by weight of urea-formaldehyde resin. The resulting impregnated material is then dried in a drying oven at atmospheric pressure to a predetermined moisture content which will allow free flowing of the dried material without affecting its thermosetting properties. The dried material is then ball-milled in the presence of 2% of epichlorohydrin calculated on the basis of the weight of the dried material. Zinc stearate, usually in an amount equal to 0.25% by weight of the total admixture, as well as a coloring agent are added preferably at the same time as the epichlorohydrin. The resulting ball-milled product can be used as is or after densification in a Banbury mixer and regranulated.

*Example II*

Urea-formaldehyde syrup of the same composition as described under Example I was admixed with zinc stearate, coloring agent and epichlorohydrin in the same proportions as employed in Example I. The resulting admixture was then used to impregnate alpha cellulose filler. The resulting impregnated filler containing this pre-catalyzed thermosetting urea-formaldehyde resin was dried in the manner described in Example I except that the drying temperature was more carefully controlled to avoid subjecting the impregnated filler to thermosetting temperatures. The resulting dried material was then ball-milled after which it could be used directly as a molding composition or subjected to densification in a Banbury mixer and regranulated.

Pulverizing the dried impregnated material in a suitable pulverizer, such as a micropulverizer, is more advantageous than employing a ball mill since a pulverizer permits a faster and more economical operation and gives a superior product. A ball mill is however frequently used for grinding molding compositions since it permits the addition of other components to be ground and blended simultaneously therewith.

Although this invention has been described with particular reference to urea-formaldehyde thermosetting resins and molding compositions made therewith, it is also applicable to molding compositions whereof the resin component may be any of various other thermosetting amino resins such as the thiourea-formaldehyde and melamine-formaldehyde thermosetting resins.

Various modifications, substitutions and changes of this invention may be made by those skilled in the art in the light of this disclosure without departing from the spirit or scope of this disclosure or invention.

I claim:

1. A thermosetting molding composition comprising an uncured thermosetting urea-formaldehyde reaction product, a filler and an effective amount of epichlorohydrin as a latent curing catalyst.

2. A thermosetting molding composition comprising an uncured thermosetting amino resin selected from the group consisting of urea-formaldehyde, thiourea-formaldehyde and melamine-formaldehyde and an effective amount of epichlorohydrin as a latent curing catalyst.

3. A thermosetting urea-formaldehyde molding composition comprising an uncured urea-formaldehyde reaction product, a substantially inert filler material and an effective amount of epichlorohydrin as a latent curing catalyst, said effective amount being at least 0.25% by weight of said composition.

4. A thermosetting urea-formaldehyde molding composition comprising an uncured urea-formaldehyde reaction product and epichlorohydrin in an amount equal to 0.25 to 5% by weight of said composition.

5. A solid molded material obtained by subjecting a thermosetting composition comprising an urea-formaldehyde reaction product and an effective amount by weight of epichlorohydrin as a latent curing catalyst to thermosetting molding conditions.

6. A solid molded material obtained by subjecting a molding composition containing a thermosetting urea-formaldehyde reaction product and 0.25 to 5.0% by weight epichlorohydrin to a temperature in the range 120–150° C. and a pressure in the range 300–5000 p. s. i.

7. A solid material obtained by subjecting a composition consisting essentially of a thermosetting urea-formaldehyde reaction product, a substantially inert filler and an effective amount of epichlorohydrin as a latent curing catalyst to thermosetting molding conditions of temperature and pressure.

8. A solid material obtained by subjecting a composition consisting essentially of a thermosetting urea-formaldehyde reaction product, a cellulosic filler and 0.25 to 5% by weight of epichlorohydrin based on said composition to thermosetting molding conditions of temperature and pressure.

9. A solid material obtained by subjecting a composition consisting essentially of a thermosetting amino resin selected from the group consisting of urea-formaldehyde, thiourea-formaldehyde and melamine-formaldehyde, a filler and an effective amount of epichlorohydrin as a latent curing catalyst to thermosetting molding conditions of heat and pressure.

References Cited in the file of this patent

UNITED STATES PATENTS

| | | |
|---|---|---|
| 1,734,693 | Ripper et al. | Nov. 5, 1929 |
| 1,963,762 | Pungs et al. | June 19, 1934 |
| 2,040,212 | Orrttiner et al. | May 12, 1936 |
| 2,076,624 | De Groote | Apr. 13, 1937 |
| 2,121,077 | Ellis | June 21, 1938 |
| 2,359,166 | Smidth | Sept. 26, 1944 |
| 2,499,365 | De Groote et al. | Mar. 7, 1950 |
| 2,594,452 | Kosmin | Apr. 29, 1952 |
| 2,633,458 | Shokal | Mar. 31, 1953 |